United States Statutory Invention Registration [19]

[11] Reg. Number: H889

Kluttz [43] Published: Feb. 5, 1991

[54] STABILIZED COMPOSITIONS

[75] Inventor: Robert Q. Kluttz, Houston, Tex.

[73] Assignee: Shell Oil Company, Houston, Tex.

[21] Appl. No.: 389,933

[22] Filed: Aug. 7, 1989

[51] Int. Cl.[5] ..... C08K 5/353
[52] U.S. Cl. ..... 524/96
[58] Field of Search ..... 528/392; 524/327, 231, 524/208, 171, 343, 291

[56] References Cited

U.S. PATENT DOCUMENTS

| | | | |
|---|---|---|---|
| 3,676,401 | 7/1972 | Henry | 523/126 |
| 3,694,412 | 9/1972 | Nozaki | 260/63 CQ |
| 3,753,952 | 8/1973 | Guillet | 523/125 |
| 3,929,727 | 12/1975 | Russell et al. | 260/45.95 F |
| 4,024,104 | 5/1977 | Russell et al. | 260/45.8 R |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

OTHER PUBLICATIONS

Gerald Scott: *Developments in Polymer Stabilization*–5, 71–85 (1982).

Henman, T. J.: Developments in Polymer Stabilization–I, 39–99.

Scott, G.: *Atmospheric Oxidation and Antioxidants,* 115–157, 286–295 (1965).

*Primary Examiner*—Robert L. Stoll
*Assistant Examiner*—Joseph D. Anthony

[57] ABSTRACT

Improved processabiity and thermal stability is demonstrated by stabilized compositions comprising a linear alternating polymer of carbon monoxide and at least one ethylenically unsaturated hydrocarbon having incorporated therein a stabilizing quantity of a stable organic free radical.

16 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STABILIZED COMPOSITIONS

FIELD OF THE INVENTION

This invention relates to certain stabilized compositions comprising a linear alternating polymer of carbon monoxide and at least one ethylenically unsaturated hydrocarbon. More particularly, it relates to such polymer compositions of improved processability and heat stability. Background of the Invention

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,018,304 produced similar polymers of higher carbon monoxide content in the presence of alkyl-phosphine complexes of palladium as catalyst. Nozaki extended the reaction to produce linear alternating polymers in the presence of aryl-phosphine complexes of palladium moieties as catalyst and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of these polymers, now becoming known as polyketones or polyketone polymers, are illustrated by a number of published European Patent Application Nos. including 121,965, 181,014, 213,671 and 257,663. The process, now broadly conventional, typically involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polyketone polymers are relatively high molecular weight materials having established utility as premium thermoplastics in the production of shaped articles by methods conventional for the processing of thermoplastics. Although the polymers are relatively stable, the polymers do undergo some loss of desirable properties when exposed to elevated temperatures or when subjected to repeating cycles of melting and solidification.

Russell et. al, U.S. Pat. Nos. 3,929,727 and 4,024,104, teach the use of certain hindered phenolic benzophenones and benzotriazoles as thermal stabilizers of certain polymers of carbon monoxide and ethylene with the optional presence of third monomers. Although the scope of the disclosure of polymers by Russell et al is rather broad and includes linear alternating polymers, the scope of the materials tested is rather narrow and the Russell et al teachings do not appear to be directed toward linear alternating polymers. It would be of advantage to provide additional materials which will impart melt stability and heat stability to linear alternating polymers of carbon monoxide and at least one ethylenically unsaturated hydrocarbon.

SUMMARY OF THE INVENTION

The invention provides polymer compositions stabilized against the adverse effect of exposure to elevated temperature which are further characterized by improved processability. More particularly, the invention provides compositions comprising linear alternating polymer of carbon monoxide and at least one ethylenically unsaturated hydrocarbon, which compositions demonstrate improved thermal stability and melt stability upon incorporation within the linear alternating polymer of certain hindered phenolic stabilized free radicals.

DESCRIPTION OF THE INVENTION

The composition of the invention comprise linear alternating polymer of carbon monoxide and at least one ethylenically unsaturated hydrocarbon stabilized by the incorporation within the polymer of certain hindered phenolic stabilized free radicals. The ethylenically unsaturated hydrocarbons useful as the precursors of the linear alternating polymers have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene and 1-dodecene, or are arylaliphatic having an aryl substituent on an otherwise aliphatic molecule, preferably an aryl substituent on a carbon atom of the ethylenic unsaturation. Illustrative of this latter class of ethylenically unsaturated hydrocarbon are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an $\alpha$-olefin such as propylene.

The structure of the polyketone polymers is that of a linear alternating polymer and the polymer contains substantially one molecule of carbon monoxide for each molecule of unsaturated hydrocarbon. When the preferred terpolymers are to be stabilized according to the invention there will be within the polymeric chain at least about two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the repeating formula $$\left[CO\left(CH_2-CH_2\right)\right]_x\left[CO\left(G\right)\right]_y \qquad (I)$$

wherein G is a moiety of the second hydrocarbon of at least 3 carbon atoms polymerized through the ethylenic unsaturation. The $-CO\left(CH_2CH_2\right)-$ units and any $-CO\left(G\right)-$ units are found randomly throughout the polymer chain and the ratio of y:x is no more than about 0.5. In the modification of the invention employing copolymers without the presence of a second hydrocarbon, the polymer is represented by the above formula (I) wherein y is zero. When y is other than zero, i.e., terepolymers are employed, the preferred ratios of y:x are from about 0.01 to about 0.1. The end groups or "caps" of the polymer chain will depend upon what materials were present during the production of the polymer and how or whether the polymer has been purified. The precise nature of the end groups does not appear, however, to be of any particular significance so far as the overall properties of the polymer are concerned so that the polymer is fairly represented by the formula for the polymer chain as depicted above.

Of particular interest are the polyketone polymers of number average molecular weight from about 1000 to about 20,000, particularly those polymers of number average molecular weight from about 20,000 to about 90,000 as determined by gel permeation chromatography. The physical properties of the polymers will depend in part on the molecular weight, whether the polymer is a copolymer or a terpolymer and, in the case of terpolymers, the nature of and the proportion of the second hydrocarbon present. Typical melting points for the polymers are from about 175° C. to about 300° C. but preferred polymers have melting points from about 210° C. to about 275° C. The polymers have a limiting viscosity number (LVN), measured in m-cresol at 60° C., of from about 0.4 dl/g to about 10 dl/g but more often from about 0.8 dl/g to about 4 dl/g.

The process for the production of the polyketone polymers is illustrated by the above published European Patent Applications and a process now becoming broadly conventional is to contact the carbon monoxide and ethylenically unsaturated hydrocarbon in the presence of a catalyst composition formed from a palladium compound, the anion of a non-hydrohalogenic acid having a pKa (measured in water at 18° C.) of below about 6, preferably below 2, and a bidentate ligand of phosphorus. The scope of the process for polymerization is extensive but, without wishing to be limited, a preferred palladium compound is a palladium alkanoate, particularly palladium acetate, a preferred anion is the anion of trifluoroacetic acid or p-toluenesulfonic acid and a preferred bidentate phosphorus ligand is 1,3-bis(-diphenylphosphino)propane or 1,3-bis[di(2-methoxyphenyl)phosphino]propane.

Polymerization is conducted in the liquid phase by contacting the carbon monoxide and the hydrocarbon reactant(s) under polymerization conditions in the presence of the catalyst composition and reaction diluent. Useful reaction diluents include lower alkanols, especially methanol. Typical polymerization conditions include reaction temperatures from about 20° C. to about 150° C., preferably from about 50° C. to about 135° C. Suitable reaction pressures are from about 1 atmosphere to about 200 atmospheres, but pressures from about 10 atmospheres to about 100 atmospheres are preferred. Subsequent to reaction the polymerization is terminated as by cooling the reaction and contents and by releasing the pressure. The polymer product is customarily obtained as a material substantially insoluble in the reaction diluent and is recovered by well known methods such as filtration and decantation. The polymer is used as recovered or is purified as by contact with a solvent or extracting agent which is selective for catalyst residues.

The polyketone polymer is stabilized according to the invention by the incorporation therein of a stabilizing quantity of an oxygen-containing, stable organic free radical derived from a phenolic compound wherein the hydroxyl group is hindered by the presence of at least one branched alkyl substituent, and preferably two such substituents, located on carbon atom(s) ortho to the carbon atom on which the phenolic hydroxyl group is located. It is generally recognized that organic free radicals are very reactive and are not capable of sustained independent existence. However, the oxygen-containing free radicals employed as the stabilizers of the invention are capable of such independent existence through a combination of steric hindrance and extensive delocalization of the unpaired electron of the free radical throughout the structure of the free radical. The delocalization also results in additional difficultly in depicting the oxygen-containing stable free radical, since the free radical exists in a number of resonance forms. For convenience, the free radical will be depicted with the unpaired electron located on an oxygen atom attached to the aromatic ring additionally containing the ortho branched alkyl substituent(s). This ring will also contain, in the para position relative to the oxygen, a group capable of resonance interaction with the aromatic ring to which it is attached. The preferred oxygen-containing organic stable free radicals have up to 30 carbon atoms and are represented by the formula

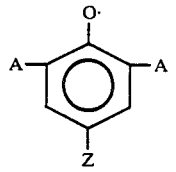

(II)

wherein A independently is branched alkyl of from 3 to 5 carbon atoms inclusive and Z is cyano, $—CO_2R$, $—SO_2R$, —CH=NR,

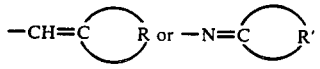

wherein R independently is aromatic of from 1 to 2 aromatic rings inclusive or cycloaliphatic and R' independently, together with the carbon atom to which it is attached, is cycloaliphatic. The nomenclature of such free radicals is difficult, but illustrative of the stabilizers utilized in the compositions of the invention are the following.

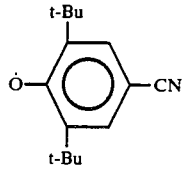

(IIIa)

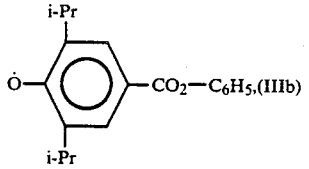

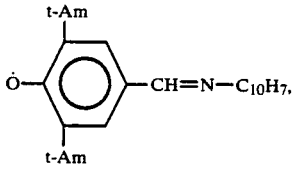

(IIIc)

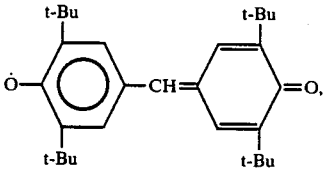

(IIId)

United States Patent Office

PTO - BOYERS, PA Duty Station

MISSING PAGE TEMPORARY NOTICE

PATENT # H889 FOR ISSUE DATE 2.5.91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 5 - 6

N/A at Boyers
7/30/92

Data Conversion Operation

Boyers, Pa 3 to 5 carbon atoms inclusive and in the para position with a group capable of resonance interaction with the aromatic ring to which it is attached.

3. The composition of claim 2 wherein the stabilizing quantity is from about 0.01% by weight to about 10% by weight, based on total composition.

4. The composition of claim 3 wherein the free radical is represented by the formula

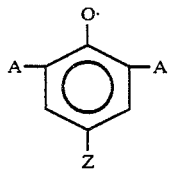

wherein A independently is branched alkyl of from 3 to 5 carbon atoms inclusive, and Z is cyano, $—CO_2R$, $—SO_2R$, —CH=NR,

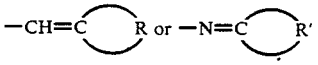

wherein R independently is aromatic of from 1 to 2 aromatic rings inclusive or cycloaliphatic, and R′ together with the carbon atom to which it is attached is cycloaliphatic.

5. The composition of claim 4 wherein y is zero.

6. The composition of claim 5 wherein the free radical is Galvinoxyl.

7. The composition of claim 4 wherein G is a moiety of propylene and the ratio of y:x is from about 0.01 to about 0.1.

8. The composition of claim 7 wherein the free radical is Galvinoxyl.

9. A process of stabilizing a linear alternating polymer of carbon monoxide and at least one ethylenically unsaturated hydrocarbon which comprises incorporating therein a thermally stabilizing quantity of an oxygen-containing organic stable free radical, wherein the linear alternating polymer is represented by the repeating formula

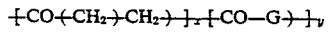

wherein G is a moiety of an ethylenically unsaturated hydrocarbon of at least 3 carbon atoms polymerized through the ethylenic unsaturation and the ratio of y:x is no more than about 0.5.

10. The process of claim 9 wherein the free radical has an unpaired electron on an oxygen attached to an aromatic ring, which ring is substituted in at least one ortho ring position with a branched alkyl group of from 3 to 5 carbon atoms inclusive and in the para position with a group capable of resonance interaction with the aromatic ring to which it is attached.

11. The process of claim 10 wherein the stabilizing quantity is from about 0.01% by weight to about 10% by weight, based on total stabilized composition.

12. The process of claim 11 wherein the free radical is represented by the formula

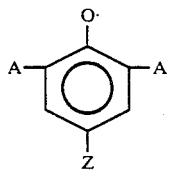

wherein A independently is branched alkyl of from 3 to 5 carbon atoms inclusive, and Z is cyano, $—CO_2R$, $—SO_2R$, —CH=NR,

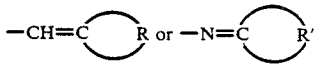

wherein R independently is aromatic of from 1 to 2 rings inclusive or cycloaliphatic and R′ together with the carbon atom to which it is attached is cycloaliphatic.

13. The process of claim 12 wherein y is zero.

14. The process of claim 13 wherein the free radical is Galvinoxyl.

15. The process of claim 12 wherein G is a moiety of propylene and the ratio of y:x is from about 0.01 to about 0.1.

16. The process of claim 15 wherein the free radical is Galvinoxyl.

* * * * *